US005241400A

United States Patent [19]
Itagaki

[11] Patent Number: 5,241,400
[45] Date of Patent: Aug. 31, 1993

[54] PICTURE-IMAGE FORMATION APPARATUS HAVING DIFFERENT CARRIER SPEEDS OR CARRYING MODES FOR DETECTING A REGISTRATION MARK FOR IMAGE FORMING

[75] Inventor: Hiroshi Itagaki, Tokyo, Japan

[73] Assignee: Canon Kabushiki Kaisha, Tokyo, Japan

[21] Appl. No.: 669,460

[22] Filed: Mar. 14, 1991

[30] Foreign Application Priority Data

Mar. 14, 1990 [JP] Japan .................................. 2-061230
May 29, 1990 [JP] Japan .................................. 2-137050

[51] Int. Cl.⁵ ........................ G03G 15/00; H04N 1/00
[52] U.S. Cl. ..................................... 358/401; 355/212; 355/233; 355/245; 346/157; 358/406
[58] Field of Search ............... 358/401, 408, 409, 412, 358/413, 474, 480, 486, 488, 490, 493, 496, 497, 95, 296, 298, 300, 302; 355/210, 212, 217, 220, 228, 233, 235, 245

[56] References Cited

U.S. PATENT DOCUMENTS 4,903,067 2/1990 Murayama et al. ................ 346/157

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A multiple picture-image formation apparatus comprises a plurality of picture-image formation devices each forming a plurality of picture images, a pattern generation device for forming a pattern for registration correction by means of the plurality of respective picture images, a carrier in which the formed pattern is carried, a reading device for reading the formed pattern, a movement device that causes the carrier to move, and a change device for changing the movement mode of the movement device between when a pattern is formed by the picture-image formation device and when the pattern is read by the reading device.

34 Claims, 9 Drawing Sheets

BLOCK DIAGRAM OF PICTURE-IMAGE PATTERN FORMATION CIRCUIT FOR ONE REGISTRATION CORRECTION AND PATCH FORMATION CIRCUIT SHOWING AN EMBODIMENT OF THE PRESENT INVENTION

PICTURE-IMAGE FORMATION APPARATUS HAVING DIFFERENT CARRIER SPEEDS OR CARRYING MODES FOR DETECTING A REGISTRATION MARK FOR IMAGE FORMING

BACKGROUND OF THE INVENTION

1. Field of the Invention

The present invention relates to an apparatus that forms picture images by making a plurality of picture images overlap each other, for example, a color picture image formation apparatus by which picture images of two or more colors are made to overlap each other.

2. Description of the Related Art

Various kinds of printers that form multiple picture images by making two or more picture images overlap each other have been proposed up to the present time. As a typical example, an image formation apparatus which is capable of irradiating a plurality of photosensitive drums with corresponding light beams (laser beams) to form color picture images by a photoelectric process has been proposed. In this type of apparatus, each of the color picture images which are formed on each photosensitive drum and transferred to a common transfer belt. The images so transferred sometimes do not come into registration due to mechanical mounting errors between the photosensitive drums, errors in the length of a light path of each laser beam, variations in the light path, etc. For this reason, the prior art proposed the following: forming patterns for registration correction on the transfer belt and reading such patterns by a sensor composed of CCDs or the like from each photosensitive drum. Registration variations on the photosensitive drum corresponding to each color are detected. Based on the detection, electrical correction is made on image signals to be recorded, or optical system such as a mirror or the like disposed in a light path of a laser beam is moved and positioned by a drive means so as to correct variations in the length of a light path or in the light path.

However, in the above-mentioned conventional picture image formation apparatus, where a registration pattern is read out by the above sensor, the storage time of the sensor is short, particularly in a high-speed color copier, since the reading is performed in a time period equivalent to that of the usual copy process. Thus, the S/N ratio of signals read becomes poor. Even if the registration pattern is read, a special-purpose picture-image processing means is required in order to remove noise components after the reading and to ensure registration correction.

In a high-speed reading, another problem occurs if, for instance, the light quantity of an illumination lamp is increased in order to improve the S/N ratio of registration pattern signals, power consumption increases considerably in comparison to power consumed at normal times.

These problems occur not only for a photoelectric color printer but for other prints where two or more picture images are made to overlap as well, such as an ink jet type or a thermal transfer type printer.

SUMMARY OF THE INVENTION

The present invention aims at providing a picture-image formation apparatus in which the above-mentioned problems are solved.

In one aspect, the invention provides an image formation apparatus in which picture-image patterns are easily read by a sensor at the time of reading by switching the drive mode of a pattern carrier on the basis of whether the registration pattern is being read.

In another aspect the present invention provides an image formation apparatus which is capable of accurately detecting registration variations between each of plural photosensitive drums by means of a registration pattern having a high S/N ratio by setting the storage time during registration pattern reading longer than during usual picture-image formation.

In a further aspect of the present invention, the image formation apparatus comprises a pattern formation means that transfers a predetermined registration formed on each photosensitive body to a transfer belt or carrier that moves, a reading means for reading the transferred registration pattern, of the pattern formation means, and a switching means for switching a moving mode for the transfer belt between during pattern formation and during pattern reading.

The switching means is arranged to switch the moving mode by switching a drive mode for transfer belt drive means to a continuous drive mode during pattern formation. The switching means is also arranged to switch the drive mode for the transfer belt drive means to an intermittent drive mode during pattern reading.

With such construction, the switching means switches the drive mode for the transfer belt drive means between when a pattern is transferred to the transfer belt by the pattern formation means and when a reading means reads a pattern transferred to the transfer belt by, the pattern formation means, thus enabling the S/N ratio during pattern reading by the reading means to be enhanced.

The switching means also switches the drive mode for the transfer belt drive means to a continuous mode during pattern formation so that a predetermined pattern can be formed on the transfer belt.

The switching means also switches the drive mode for the transfer belt drive means to an intermittent mode during pattern reading to decrease the speed of the movement of the transfer belt to a speed lower than that during pattern formation so that the accuracy of reading a pattern can be enhanced.

In a further aspect of the present invention, a speed switching means is disposed for switching the drive speed of a carrier on which registration patterns are carried, between during pattern formation and during pattern reading.

The switching means is also arranged to switch the drive speed during pattern reading to a lower speed than the drive speed during pattern formation.

The switching means switches the drive speed set in the carrier drive means between when a pattern is formed by the pattern formation means and when a reading means reads the pattern formed by the pattern formation means, thus enabling the S/N ratio during pattern reading by the readout means to be enhanced.

The switching means also switches the drive speed set in the pattern carrier to a lower speed during pattern reading so that the accuracy of reading a pattern by the reading means can be enhanced.

These and other objects, features and advantages of the present invention will become clear when reference is made to the following description of the preferred embodiments of the present invention, together with reference to the accompanying drawings.

DESCRIPTION OF THE PREFERRED EMBODIMENTS

Figure 1:
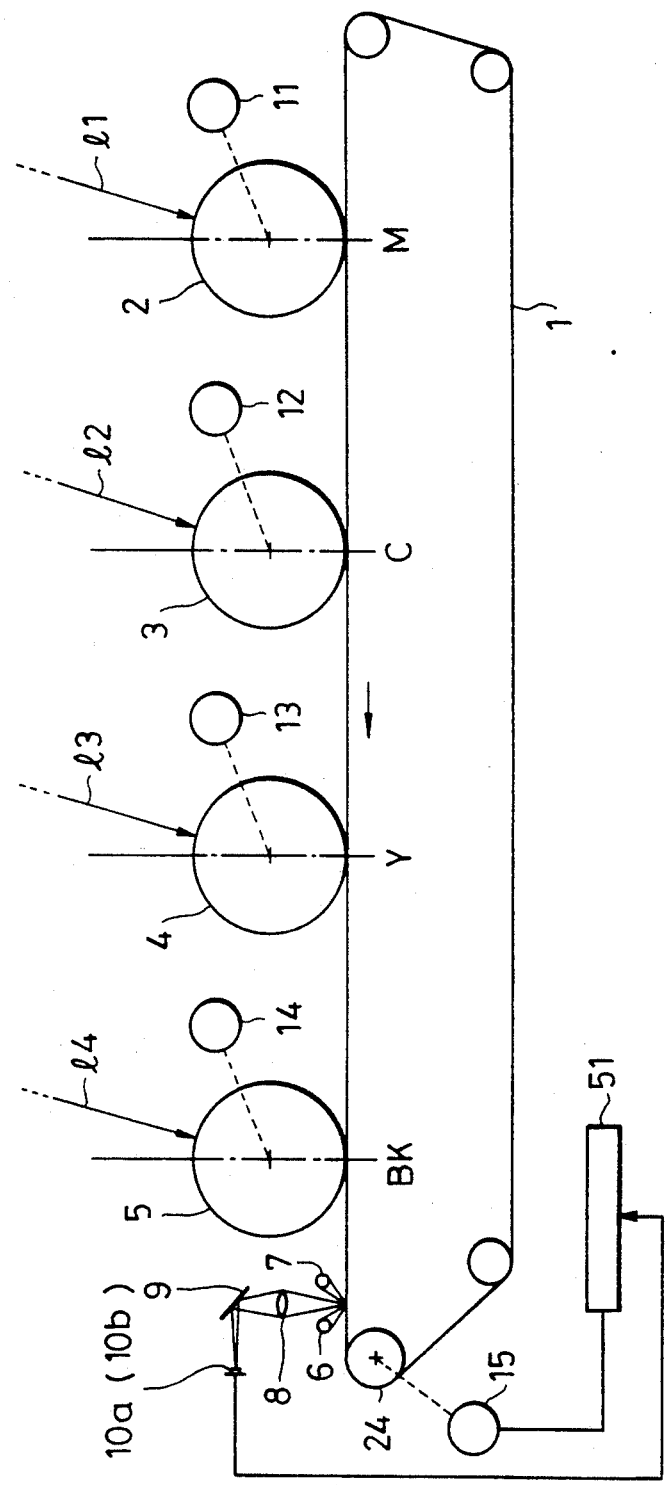
FIG. 1 is a schematic view showing the construction of a picture-image formation apparatus of an embodiment of the present invention.

FIG. 1 is a schematic view showing the construction of an image formation apparatus embodying the present invention. Reference numeral 1 denotes a transfer belt, which is moved in the direction of the arrow (in the center of the figure) at a predetermined speed or at a speed lower than this predetermined speed as a result of the action of a pulse motor 15 constituting a transfer belt drive means in the present embodiment which is transmitted to a drive roller 24 according to different types of operation modes which will be described later.

Reference numerals 2 to 5 denote photosensitive drums. Electrostatic latent images formed by scanning with a laser beams LM (11), LC (12), LY (13), and LBK (14) corresponding to magenta (M), cyan (C), yellow (Y), and black (B) respectively are made visible by a toner housed in a developer (not shown). A color image is formed on the transfer belt 1 and then transferred. Reference numerals 11 to 14 denote drum motors which cause the photosensitive drums 2 to 5 to rotate at a predetermined speed. A pattern formation means of the present invention reads out predetermined pattern data for registration correction (e.g., a plus symbol "+" having a predetermined width) stored in a ROM (not shown) or the like, then forms a pair of registration pattern latent images at two axially opposite predetermined positions of the photosensitive drums 2 to 5 by scanning with the laser beams LM, LC, LY, and LBK modulated on the basis of the pattern data, and then develops these latent images by respective color toners of magenta (M), cyan (C), yellow (Y), and black (B). Thus, a pair of images are formed in such a manner as to be in correspondence to a means that transfers these to the transfer belt 1 and to be in opposition at a predetermined position in a widthwise direction at right angles to the transport direction of the transfer belt 1 in this embodiment.

A reading means comprises illumination lamps 6 and 7, a condenser lens 8, a mirror 9, sensors 10a and 10b composed of CCDs. The reading means reads a pattern by causing the sensors 10a and 10b to image a reflected light obtained by illuminating a registration pattern (e.g., a plus symbol "+" having a predetermined width) formed on the transfer belt 1 which moves in accordance with the drive of the pulse motor 15. Reference numeral 51 denotes a controller section that centrally controls the formation of normal picture images and predetermined patterns for registration correction, and controls the reading of patterns for registration correction in accordance with control programs stored in ROMs or the like.

In the picture-image formation apparatus constructed as described above, a switching means (in this embodiment, a mode switching circuit 22 that operates by a command from a system controller 21) switches a drive mode for the transfer belt drive means (in this embodiment, a pulse motor 15) between when a pattern is transferred to the transfer belt 1 by means of a pattern formation means and when a reading means (composed of sensors 10a and 10b, CCD drivers 18 and 19, or the like (See FIG. 2)) reads the pattern transferred to the transfer belt 1 by means of the pattern formation means, so that the S/N ratio by the readout means (sensors 10a and 10b) during pattern reading can be enhanced.

The switching means also switches the drive mode for the transfer belt drive means to a continuous mode during pattern formation so that a predetermined pattern can be formed on the transfer belt.

In addition, the switching means switches the drive mode for the transfer belt drive means to an intermittent mode during pattern reading to decrease the speed of the movement of the transfer belt to a speed lower than that during pattern formation, so that the accuracy of reading a pattern by the reading means can be enhanced.

Figure 2:
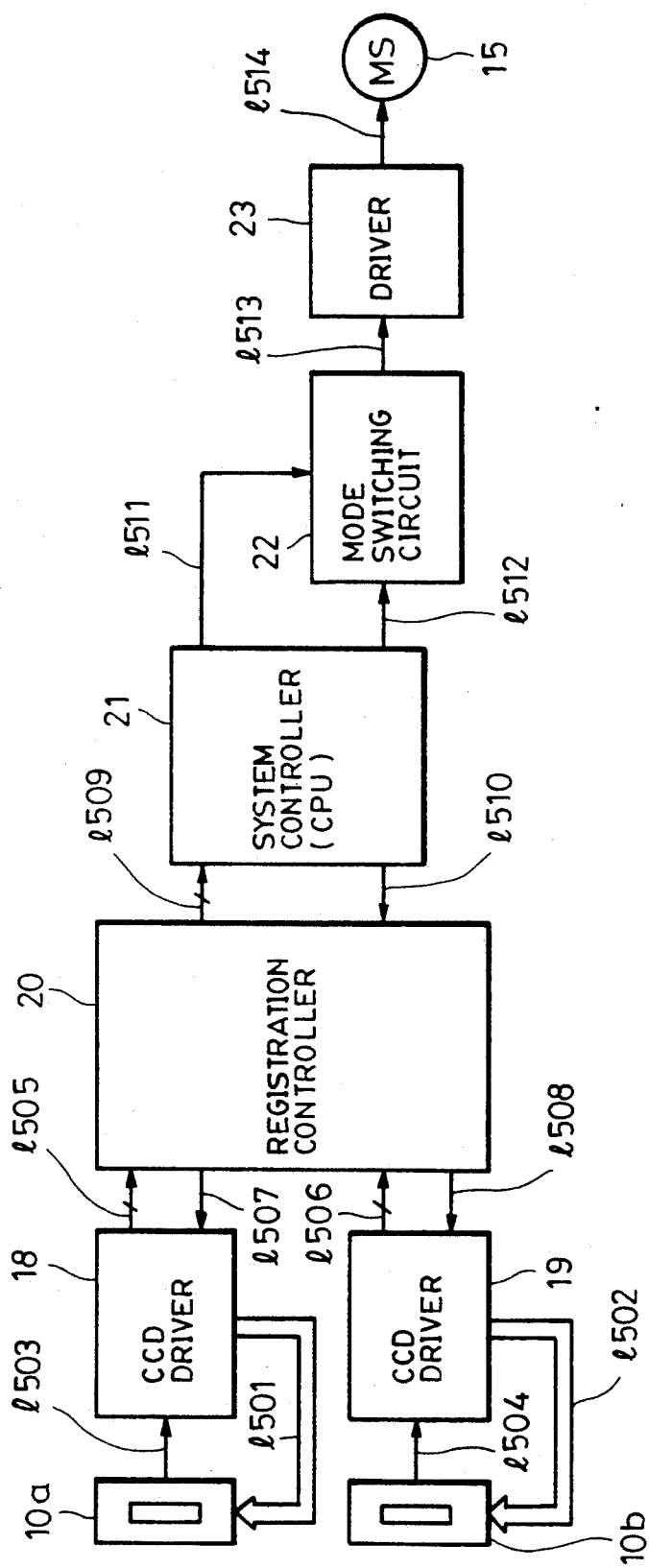
FIG. 2 is a block diagram showing the detailed construction of a controller section shown in FIG. 1.

FIG. 2 is a block diagram showing a detailed construction of the controller section 51 shown in FIG. 1. Parts which are the same as those shown in FIG. 1 are given the same reference numerals. In FIG. 2, reference numeral 21 denotes a system controller consisting of a CPU. The system controller sends out a mode switching signal 1512, as well as a motor starting signal 1511, to a mode switching circuit 22. The system controller 21 also sends out a start timing signal 1510 to a registration controller 20. The registration controller 20 analyzes picture-image pattern data 1505 and 1506 output from the CCD drivers 18 and 19 and outputs mirror drive data 1509 used for registration correction to the system controller 21. The registration controller 20 supplies oscillation clocks 1507 and 1508 to the CCD drivers 18 and 19. The CCD drivers 18 and 19 outputs pulse signals 1501 and 1502 for reading driving to corresponding sensors 10a and 10b, performs a prescribed process on picture-image signals 1503 and 1504 which are output in synchronization with the outputs of the pulse signals 1501 and 1502 in order to generate and output picture-image pattern data 1505 and 1506.

Reference numeral 23 denotes a driver that outputs a current signal 1514 to the pulse motor 15 in accordance with a pulse signal 1513 output from the mode switching circuit 22.

The operations of FIGS. 1 and 2 will be explained below.

A picture-image formation station corresponding to each developer color shown in FIG. 1 reads out specified registration pattern data for registration correction. A registration pattern latent image is formed at a designated position of the photosensitive drums 2 to 5 by scanning with laser beams LM, LC, LY, and LBK modulated on the basis of this pattern data. This latent image is developed by a color toner of magenta (M), cyan (C), yellow (Y), and black (B). First, for example, with a picture-image formation station that develops magenta as the first stage, a registration correction process is started. When a pattern for magenta is transferred to a designated position of the transfer belt 1, the pattern transferred to the transfer belt 1 by the action of the pulse motor 15 is transported in the left direction in FIG. 1 and illuminated by the illumination lamps 6 and 7. The reflected light is formed into an image in the sensors 10a and 10b through the condenser lens 8 and the mirror 9, and is read as an electrical signal.

When the pattern for registration correction corresponding to the color of the first stage reaches the reading position of the above sensors 10a and 10b, a mode switching signal 1512 is added to the mode switching circuit 22 from the system controller 21 shown in FIG. 2, and a speed slower than that during normal picture-image formation is set. A pulse signal 1513 in accordance with this set value is applied to driver 23. The pulse motor 15 is rotated at a fixed speed by means of an electrical signal 1514, and the transfer belt 1 is driven at a fixed speed.

On termination of the reading of a picture image of the first color, the system controller 21 then reverses the status of the mode switching signal 1512 so as to switch to a high-speed drive mode for normal picture-image formation.

Next, when a picture-image pattern of the second color reaches the reading position of the sensors 10a and 10b, the system controller 21 reverses the status of the mode switching signal 1512 again so as to switch the mode switching circuit 22 to a low-speed drive mode. In this way, the above operations are repeated until the reading of a picture-image pattern of the fourth color is finished.

The registration pattern for registration correction transported by the action of the transfer belt 1 is read by the sensors 10a and 10b in synchronization with the pulse signals 1501 and 1502 output from the CCD drivers 18 and 19. The picture-image signals 1503 and 1504 read in this way are subjected to an analog process such as current amplification or current reproduction in the CCD drivers 18 and 19. These signals are further converted from analog to digital using a predetermined threshold value. Picture-image pattern data 1505 and 1506, which is digital picture-image data, is output to the registration controller 20.

On the basis of the picture-image pattern data 1505 and 1506 transmitted to the registration controller 20, mechanical mounting errors between the photosensitive drums 2 to 5, and variations in the length of the light path or in the light path of the laser beams LM, LC, LY, and LBK, or the like are computed. Thus, electrical correction data of a write pictured-image signal and mirror drive data 1509 of the mirror 9 disposed in the laser beam path are determined and transmitted to the system controller 21.

Objectives for the registration correction process may include not only the above mirror 9 but the arrangement of a laser scanning system or the drum arrangement.

Referring to a flowchart shown in FIG. 3, operations of a registration correction process of the picture-image formation apparatus of the present invention will be explained below.

Figure 3:
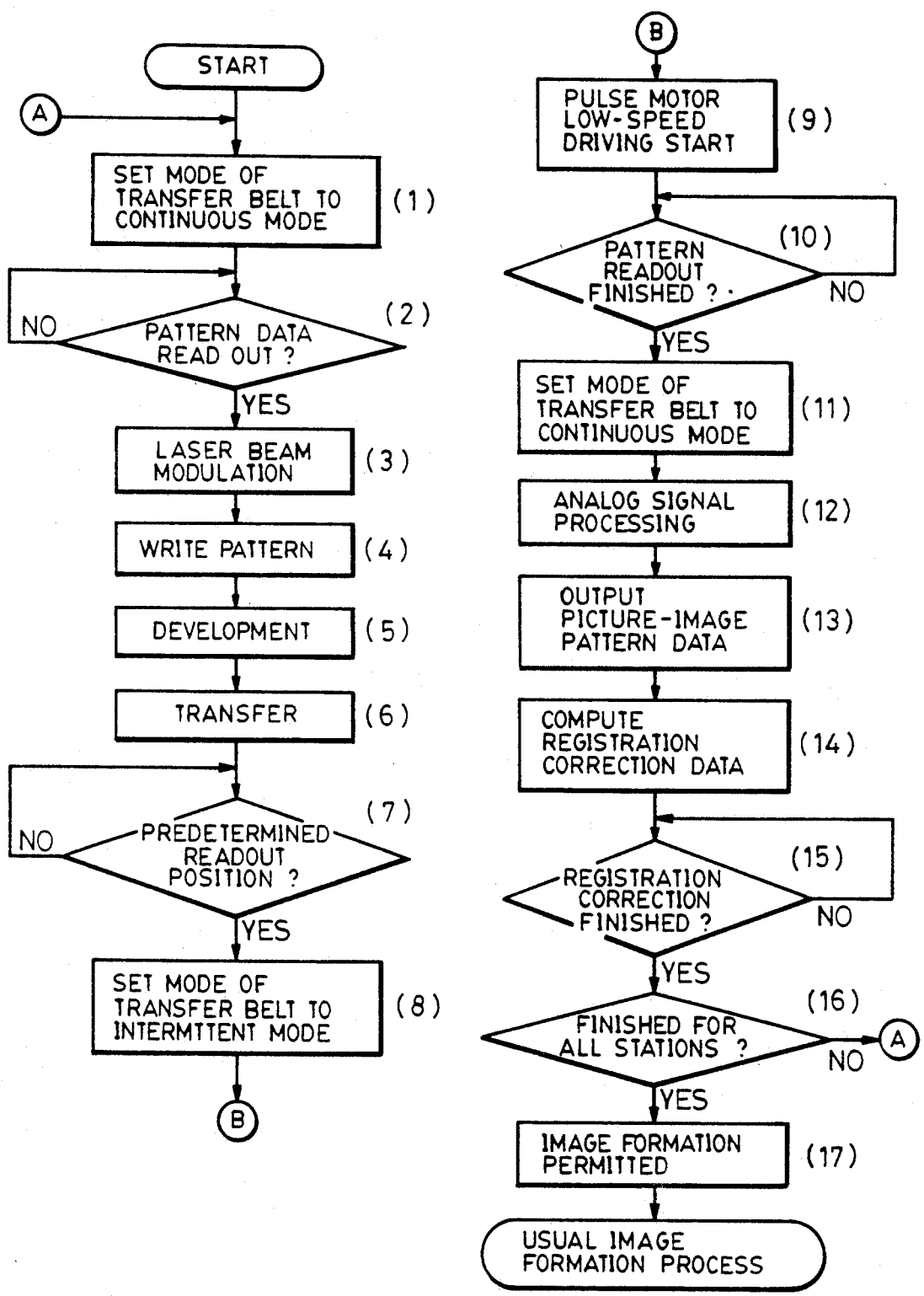
FIG. 3 is a flowchart showing an example of a registration correction processing procedure in the picture-image formation apparatus of the present invention.

FIG. 3 is a flowchart showing an example of the procedure of the registration correction process of the picture-image formation apparatus of the present invention. Numerals (1) to (17) each indicate a step.

First, the system controller 21 sets the operation mode of the transfer belt 1 to a continuous mode (1). The system controller 21 then waits for registration pattern data to be read out (2). A semiconductor laser (not shown) is modulated on the basis of the read-out registration pattern data (3). A pattern is written by scanning a corresponding photosensitive drum with a laser beam (4). Next, the registration pattern is developed with a corresponding developer (5). The developed pattern is transferred (6) to the transfer belt 1 that moves in the continuous mode. Then, the system controller waits for the transferred pattern to reach the reading position of the sensors 10a and 10b (7). When the registration pattern reaches the position, the system controller 21 sets the operation mode of the transfer belt 1 to an intermittent mode (8) so that the pulse motor 15 is driven at a speed lower than that during image formation (9), then it waits for the termination of pattern reading (10). When the reading of patterns is terminated, the system controller 21 sets the operation mode of the transfer belt 1 to an continuous mode again.

Next, a process for analog signals which are read out is started (13). Picture-image pattern data which is digital data is output to the registration controller 20 (13). Then, registration correction data is computed (14), and the system controller waits for the registration correction process to be finished (15). Then, it is determined whether or not the registration correction process is finished for all stations (16). If it is not finished, the process returns to step (1); if it is finished, image formation is permitted to begin (17) and the process shifts to the normal image formation process.

Figure 4:
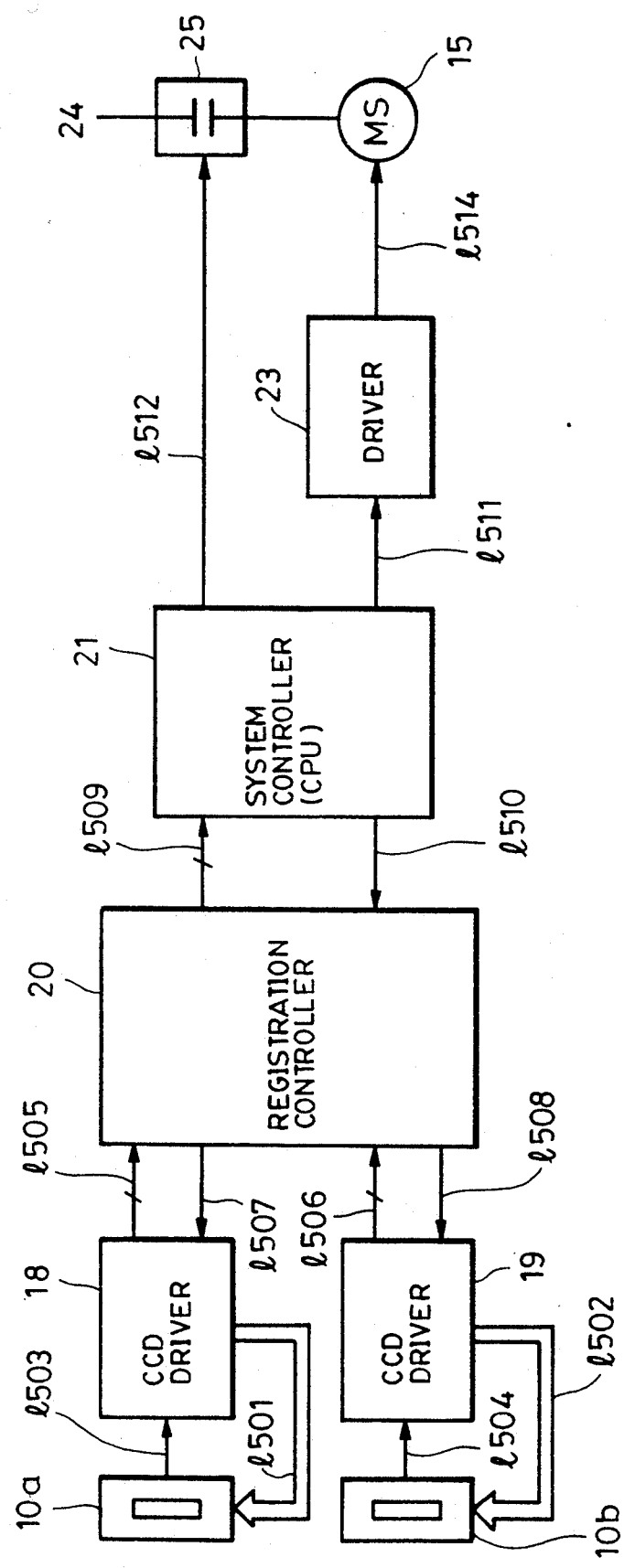
FIG. 4 is a block diagram showing another construction of the controller section shown in FIG. 1.

In the embodiment described above, the case where a drive pulse applied to the pulse motor 15 is controlled to perform a process for decreasing the speed of the transfer belt 1 was explained. As shown in FIG. 4, however, the speed of the movement of the transfer belt 1 may be changed between during registration pattern reading and during registration pattern formation by operating the pulse motor 15 in a speed-decreasing direction by means of an electromagnetic clutch 25 on the basis of a mode switching signal 1512 output from the system controller 21. Reference numeral 24 denotes a transfer belt roller.

As has been explained above, in the present embodiment, since a pattern formation means that transfers a predetermined pattern for registration correction, which is formed on each photosensitive body, to a transfer belt that moves, a reading means for reading out the pattern transferred to the transfer belt by this pattern formation means, and a switching means for switching a drive mode for a transfer belt drive means between during pattern formation and during pattern reading are disposed, the movement speed of the pattern transferred to the transfer belt for a registration correction process can be slowed down to a speed lower than during pattern formation just before a pattern is read.

Since the switching means is arranged to switch a drive mode for the transfer belt drive means to a continuous drive mode at the time of pattern formation, a correct pattern for registration correction can be formed on the transfer belt.

In addition, since the switching means is arranged to switch a drive mode for the transfer belt drive means to an intermittent drive mode at the time of pattern reading, the reading means can output a picture-image pattern signal having an high S/N ratio.

As a result, accurate registration variations can be detected. The picture-image display device of the present invention has an advantage in that it forms clear color picture images free of registration variations.

The above embodiment is an example in which the movement mode of a pattern carrier (transfer belt) is changed from a continuous feed to an intermittent feed. Next, another embodiment in which the movement speed of the transfer belt is switched from a high-speed mode during pattern formation to a low-speed mode during pattern reading will be explained. Since FIG. 1 is common in this embodiment, an explanation of the duplicate parts is omitted.

In FIG. 1, a switching means (in this embodiment, a speed switching circuit 22' that operates by a command from a system controller 21) switches a drive speed set in the transfer belt drive means (in this embodiment, a pulse motor 15) between when a pattern is transferred to the transfer belt 1 by means of a pattern formation means and when a reading means (sensors 10a and 10b, CCD drivers 18 and 19, or the like (see FIG. 5)) reads the transferred pattern by means of the pattern formation means, so that an S/N ratio during pattern readout by the reading means (sensors 10a and 10b) is enhanced, and each of the transferred pattern corresponding to each of the photosensitive drum 2 to 5 is read successively.

The switching means also switches a drive speed set in the transfer belt drive means during pattern reading to a speed lower than that during pattern formation so that the accuracy of reading a pattern by the reading means can be enhanced.

Figure 5:
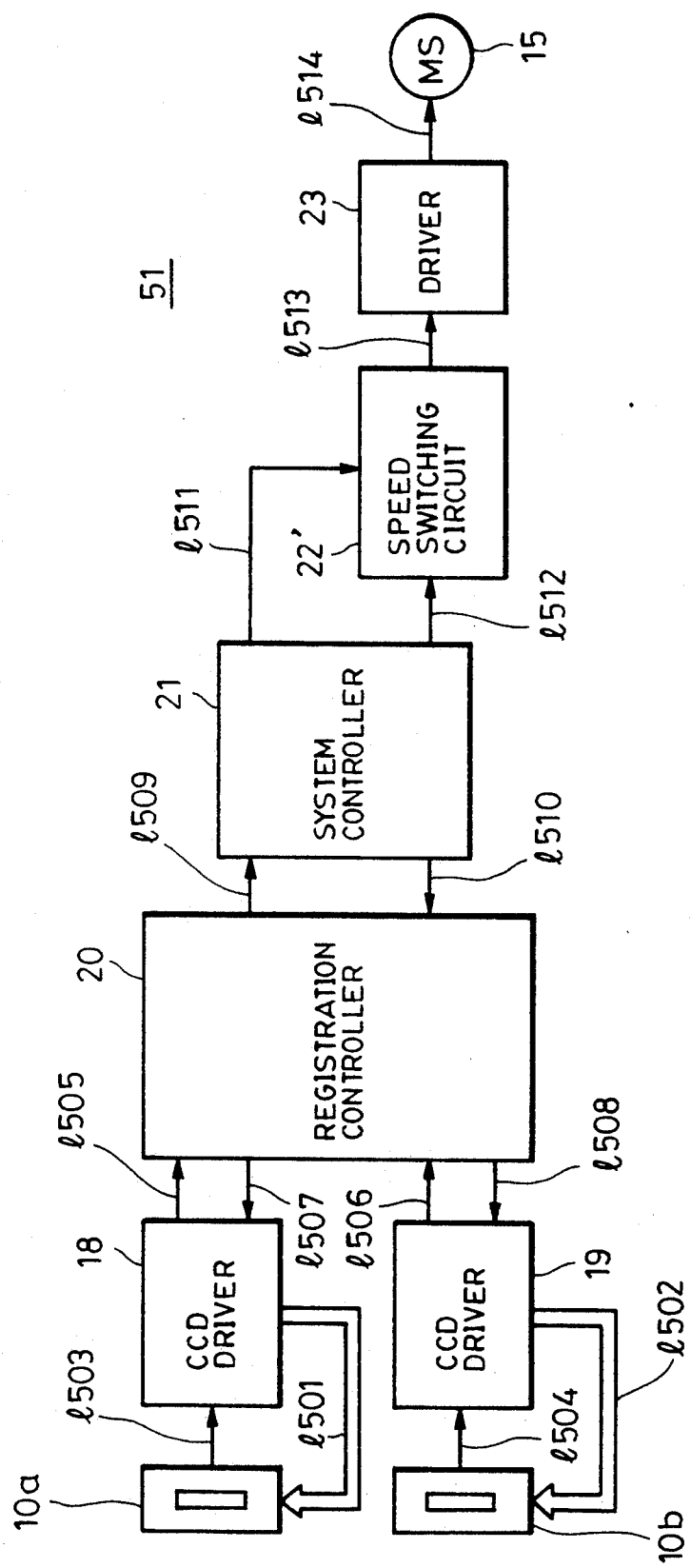
FIG. 5 is a block diagram showing a detailed construction of a controller section of another embodiment.

FIG. 5 is a block diagram showing a detailed construction of the controller section 51 shown in FIG. 1 in this embodiment. Parts which are the same as those shown in FIGS. 1 and 2 are given the same reference numerals.

In FIG. 2, reference numeral 21 denotes a system controller consisting of a CPU. The system controller sends out a speed switching signal 1512, as well as a motor starting signal 1511, to a speed switching circuit 22'. The system controller 21 also sends out a starting timing signal 1510 to a registration controller 20. The registration controller 20 analyzes picture-image pattern data 1505 and 1506 output from the CCD drivers 18 and 19 and outputs mirror drive data 1509 used for registration correction to the system controller 21. The registration controller 20 supplies oscillation clocks 1507 and 1508 to the CCD drivers 18 and 19. The CCD drivers 18 and 19 output pulse signals 1501 and 1502 for reading driving to corresponding sensors 10a and 10b, performs a predetermined process on picture-image signals 1503 and 1504 which are output in synchronization with the outputs of the pulse signals 1501 and 1502 in order to generate and output picture-image pattern data 1505 and 1506.

Reference numeral 23 denotes a driver that outputs a current signal 1514 to the pulse motor 15 in accordance with a pulse signal 1513 output from the speed switching circuit 22'.

The operations of FIGS. 1 and 5 will be explained below.

A picture-image formation station corresponding to each developer color shown in FIG. 1 reads out specified registration pattern data for registration correction. A registration pattern latent image is formed at a designated position of the photosensitive drums 2 to 5 by scanning with laser beams LM, LC, LY, and LBK modulated on the basis of this pattern data. This latent image is developed by a color toner of magenta (M), cyan (C), yellow (Y), and black (B). First, for example, with a picture-image formation station that develops magenta as the first stage, a registration correction process is started. When a pattern for magenta is transferred to a designated position of the transfer belt 1, the pattern transferred to the transfer belt 1 by the action of the pulse motor 15 is transported in the left direction in FIG. 1, and illuminated by the illumination lamps 6 and 7. The reflected light is formed into an image in the sensors 10a and 10b through the condenser lens 8, and the mirror 9, and is read as an electrical signal.

When the pattern for registration correction corresponding to the color of the first stage reaches the reading position of the above sensors 10a and 10b, a mode switching signal 1512 is added to the speed switching circuit 22' from the system controller 21 shown in FIG. 2, and a speed slower than that during normal picture-image formation is set. A pulse signal 1513 in accordance with this set value is applied to driver 23. The pulse motor 15 is rotated at a fixed speed by means of an electrical signal 1514, and the transfer belt 1 is driven at a fixed speed. In this way, the reading process is successively performed until the reading of a picture-image pattern of the fourth color is finished.

To be specific, the pattern for registration correction transported by the action of the transfer belt 1 is read by the sensors 10a and 10b in synchronization with the pulse signals 1501 and 1502 output from the CCD drivers 18 and 19. The picture-image signals 1503 and 1504 read in this way are subjected to an analog process such as current amplification or current reproduction in the CCD drivers 18 and 19. These signals are further converted from analog to digital using a predetermined threshold value. Picture-image pattern data 1505 and 1506, which is digital picture-image data, are output to the registration controller 20.

On the basis of the picture-image pattern data 1505 and 1506 transmitted to the registration controller 20, mechanical mounting errors between the photosensitive drums 2 to 5, variations in the length of the light path or in the light path of the laser beams LM, LC, LY, and LBK, or the like, are computed. Thus, electrical correction data of a write picture-image signal and mirror drive data 1509 of the mirror 9 disposed in the laser beam path are determined and transmitted to the system controller 21.

Objectives for the registration correction process may include not only the above mirror 9 but the arrangement of a laser scanning system or the drum arrangement.

Referring to a flowchart shown in FIG. 6, operations of a registration correction process of the picture-image formation apparatus of the present invention will be explained below.

Figure 6:
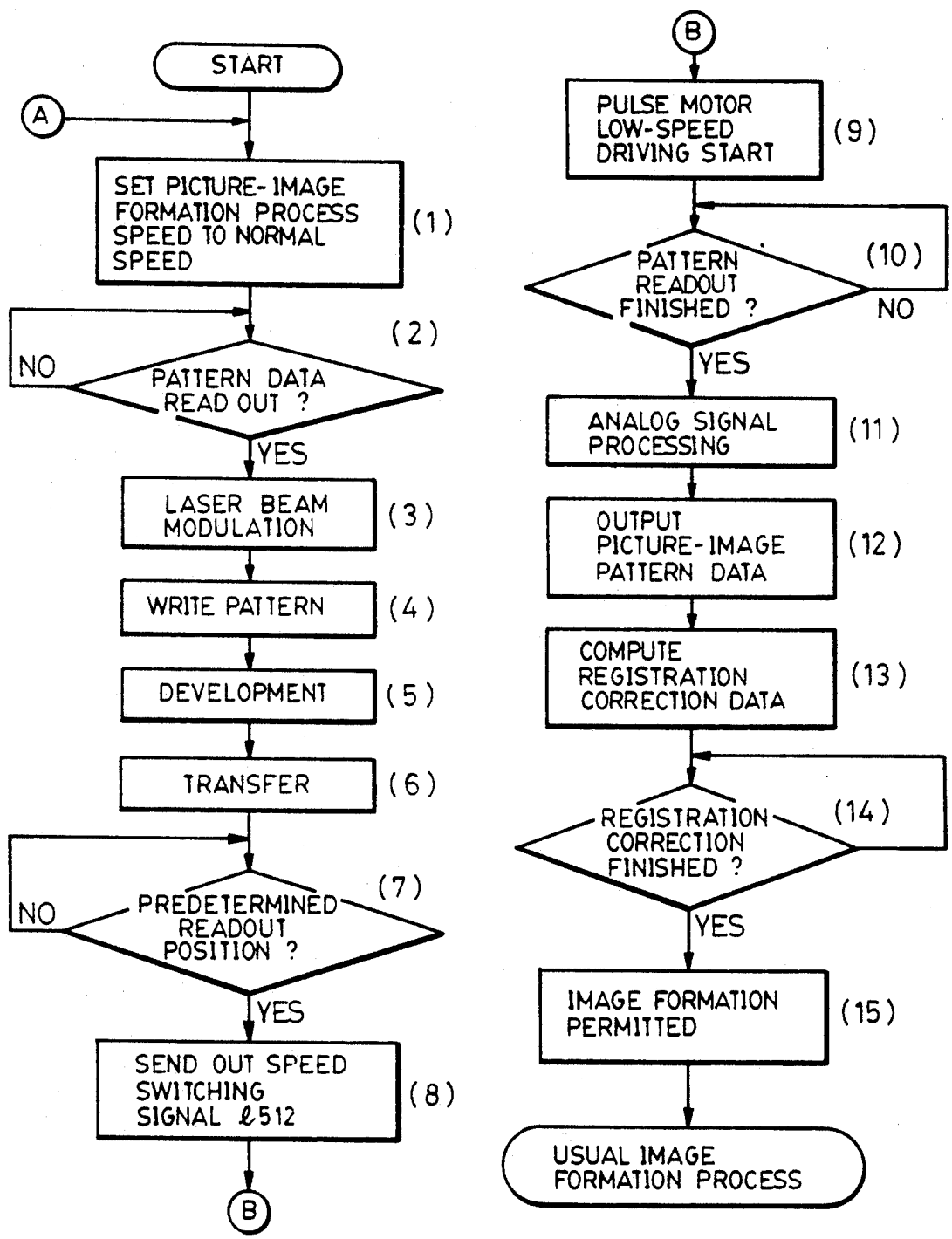
FIG. 6 is a flowchart showing an example of a registration correction processing procedure of another embodiment.

FIG. 6 is a flowchart showing an example of the procedure of the registration correction process of the picture-image formation apparatus of the present invention. Numerals (1) to (15) each indicate a step.

First, the system controller 21 sets the transport speed of the transfer belt 1 to a normal speed which is set at a normal picture-image formation process speed (1). The system controller 21 then waits for registration pattern data to be read out (2). A semiconductor laser (not shown) is modulated on the basis of the read-out registration pattern data (3). A pattern is written by scanning a photosensitive drum with a laser beam (4). Next, the registration pattern is developed with a corresponding developer (5). The developed pattern is transferred (6) to the transfer belt 1 which is moved and transported at a normal speed. Then, the system controller waits for the transferred pattern to reach the reading position of the sensors 10a and 10b (7). When the registration pattern reaches the reading position, the system controller 21 sends out the speed switching signal 1512 for switching the transport speed of the transfer belt 1 to a speed lower than the above picture-image formation process speed to the mode switching circuit 22 (8). As a result, the pulse motor 15 is driven at a speed lower than that during image formation (9). The system controller waits for the termination of the reading of patterns formed in each picture-image formation station (10). When the reading of patterns is terminated, a process for analog signals which are read out is started (11). Picture-image pattern data which is digital data is output to the registration controller 20 (12). Then, registration correction data is computed (13), and the system controller waits for the registration correction process to be finished (14). When it is finished, image formation is permitted to begin (15), and the process shifts to the normal image formation process.

In the embodiment described above, the case where a drive pulse applied to the pulse motor 15 is controlled to perform a process for decreasing the speed of the transfer belt 1 was explained. As shown in FIG. 4, however, the speed of the movement of the transfer belt 1 may be changed between during registration pattern reading and during registration pattern formation by operating the pulse motor 15 in a speed-decreasing direction by means of an electromagnetic clutch 25 on the basis of the speed switching signal 1512 output from the system controller 21.

Figure 7:
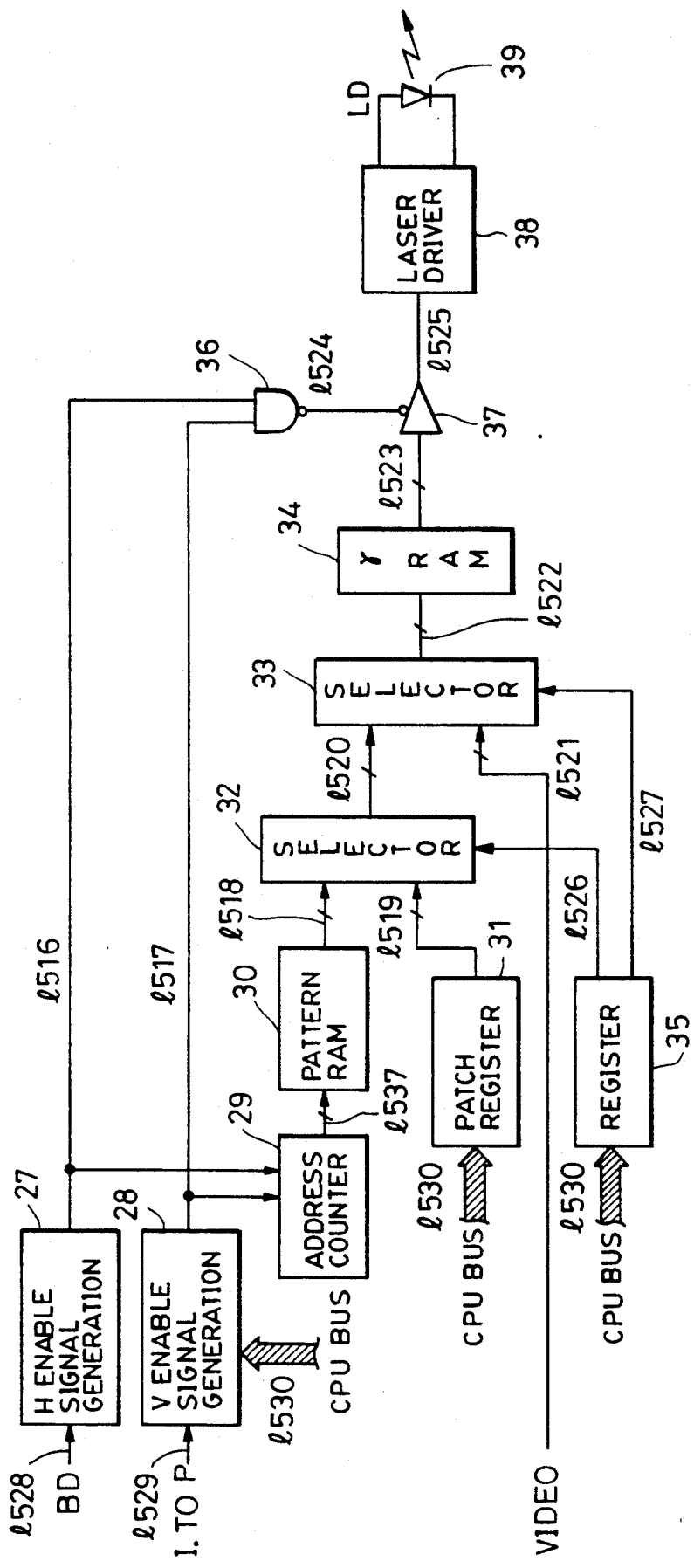
FIG. 7 is a block diagram of a circuit for forming patterns for registration correction.
Figure 9:
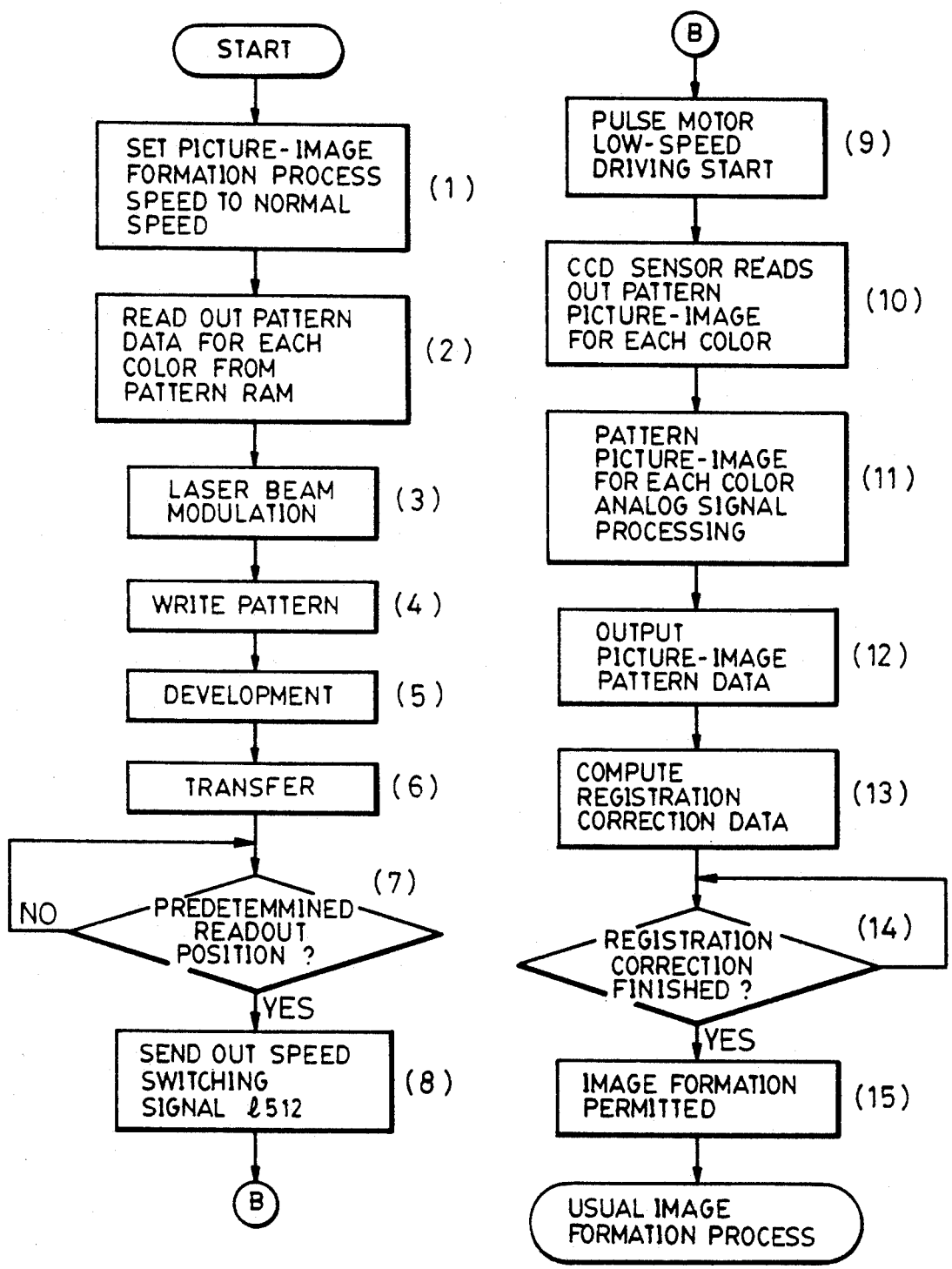
FIG. 9 is a flowchart showing an example of a registration correction procedure.

FIG. 7 is a block diagram of a circuit for forming registration patterns for registration correction of the present invention. Using a beam detect (BD) signal 1528 obtained by scanning the outside of a picture-image recording area with a laser beam as a synchronization signal in the direction of main scanning, a H enable signal 1516 is formed by a main scanning enable signal generation circuit 27. A picture-image timing signal (I TOP) 1529 in the direction of sub-scanning is input to a sub-scanning enable signal generation circuit 28. The generation circuit 28 generates a V enable signal 1517. An address signal 1537 is generated by an address counter 29 on the basis of H and V enable signals 1516 and 1517. This address signal 1537 is supplied as a reading signal for a pattern RAM 30 in which pattern images for registration correction are stored. A pattern picture-image signal 1518 read out from the pattern RAM 30 is then supplied to a selector 32. To another input of the selector 32, an output signal 1519 of a patch register 31 is input. This makes it impossible to read out pattern images because carbon black absorbs light in a reflection optical system when a carbon black type toner is used as a BK toner. Hence, a solid pattern (patch) is formed by any one of other colors (Ma, Cy, or Ye) that absorb light. A pattern image for registration correction (BK) is formed thereon. Therefore, the pattern picture-image signal 1518 and the patch signal 1519 are switched by the selector 32. For a switching signal of this selector 32, an output signal 1526 from a register 35 through a CPU data bus 1530 is used. In the present embodiment, the input of the selector 32 is switched for Ye only and is output to 1520. In the next selector 33, either the writing of a normal image (VIDEO) 1521 or the writing of a pattern image 1520 is selectively output to 1522 through a CPU data bus 1530 with the output signal 1527 from the register 35 as a switching signal and supplied to a laser driver 38 via a 7 RAM 34 and a gate 37. A light-modulated laser beam is output from a laser diode 39 in response to an input image signal 1525. In the present embodiment, pattern generation circuits are provided for each color, but a pattern RAM can be used for two or more colors. FIG. 9 is a flowchart showing an example of the procedure of the registration correction process of the picture-image formation apparatus of the present invention. Numerals (1) to (15) each indicate a step.

Figure 8:
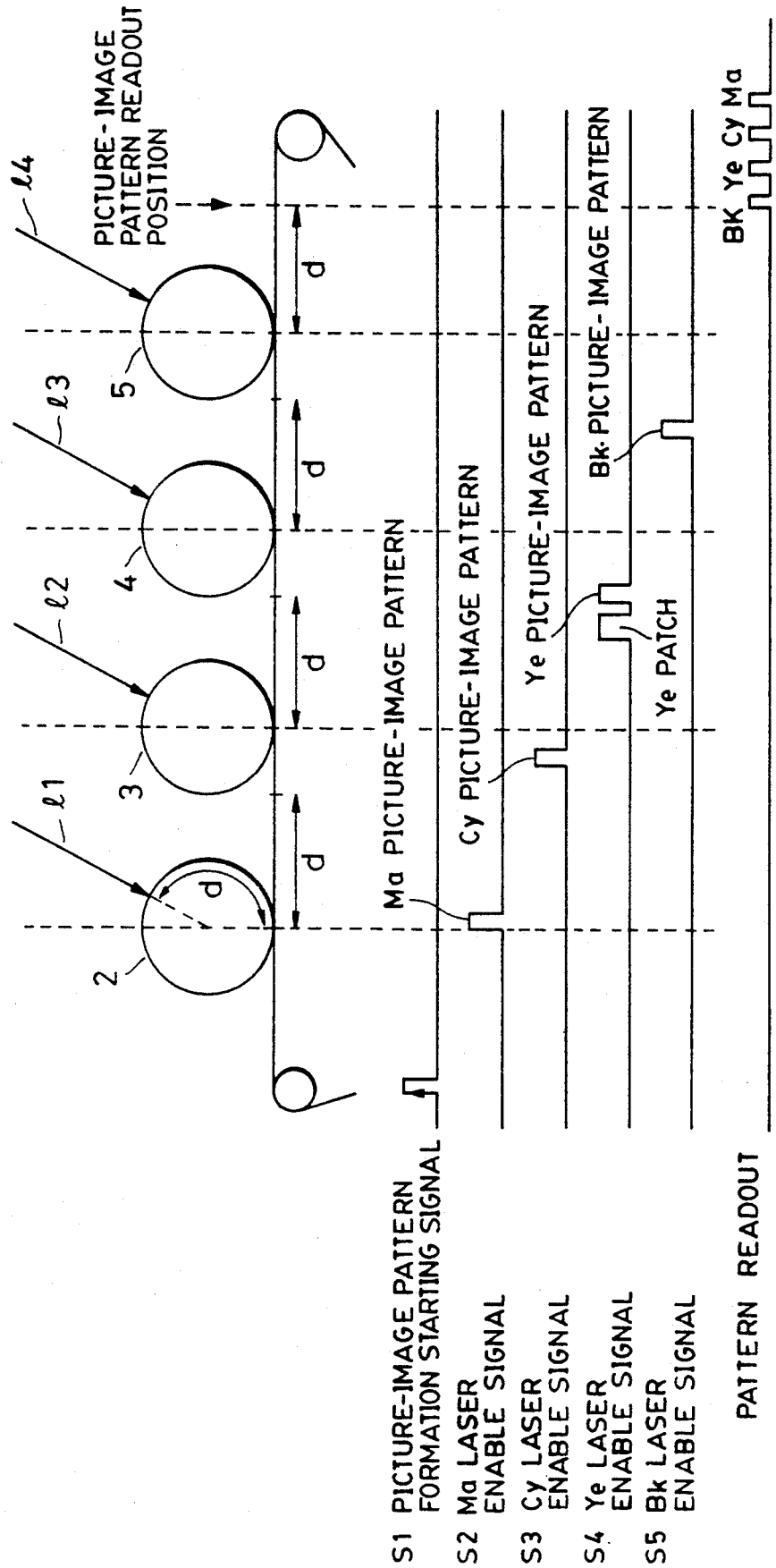
FIG. 8 is a timing chart for writing correction patterns.

First, the system controller 21 sets the transport speed of the transfer belt 1 to a normal speed which is set at a normal picture-image formation process speed (1). Then, registration pattern data of each color to be transferred for registration correction is read out from a pattern RAM (2). A semiconductor laser (not shown) is modulated on the basis of the read-out registration pattern data (3). A pattern is written by scanning a photosensitive drum with a laser beam (4). Next, the registration pattern is developed with a corresponding developer (5). The pattern is transferred (6) to the transfer belt 1 which is moved and transported at a normal speed. The above operations are performed in sequence for each color in accordance with a time chart of FIG. 8. That is, a correction pattern is formed in the order of Ma, Cy, Ye, and Bk. A patch for Ye for detecting Bk is formed before a pattern of Ye. Then, the system controller waits for the transferred pattern to reach the reading position of the sensors 10a and 10b (7). When the pattern reaches the reading position, the system controller 21 sends out the speed switching signal 1512 for switching the transport speed of the transfer belt 1 to a speed lower than the above picture-image formation process speed to the mode switching circuit 22 (8). As a result, the pulse motor 15 is driven at a speed lower than that during image formation (9). Patterns formed in each of the picture-image formation station are read (10). This reading is performed in the order of Bk, Ye, Cy, and Ma, as shown in FIG. 8. A process for analog signals which are read is started (11). Picture-image pattern data, which is digital data, is output to the registration controller 20 (12). Then, registration correction data is computed (13), and the system controller waits for the registration correction process to be finished (14). If it is finished, image formation is permitted to begin (15), and the process shifts to the normal image formation process.

In the embodiment described above, the case where a drive pulse applied to the pulse motor 15 is controlled to perform a process for decreasing the speed of the transfer belt 1 was explained. As explained with reference to FIG. 4, however, the speed of the movement of the transfer belt 1 may be changed between during pattern reading and during pattern formation by operating the pulse motor 15 in a speed-decreasing direction by means of the electromagnetic clutch 25 on the basis of the speed switching signal 1512 output from the system controller 21.

As has been explained above, in the present embodiment, since a registration pattern formation means for transferring a predetermined pattern for registration correction, which is formed on each photosensitive body, to a transfer belt that moves, a reading means for reading the pattern transferred to the transfer belt by this pattern formation means, and a speed switching means for switching a speed set in a transfer belt drive means between during pattern formation and during pattern reading are disposed, the movement speed of the pattern transferred to the transfer belt for a registration correction process can be slowed down to a speed lower than that during pattern formation just before a pattern is read, and patterns for predetermined registration correction formed successively on each photosensitive body can be read.

In addition, since the switching means is arranged to switch a drive speed set in the transfer belt drive means to a speed lower than a drive speed at the time of pattern formation, the reading means can output a picture-image pattern signal having a high S/N ratio.

As a result, accurate registration variations can be detected easily without changing the arrangement of a conventional registration correction process mechanism. Thus, the picture-image formation apparatus of the present invention has an advantage in that it forms clear color pictures image free of registration variations.

In the above-mentioned embodiments, the correct patterns are formed on the transferring belt, but they can be formed on the recording paper or other materials.

The present invention is not limited for use with the above-mentioned color photoelectric printer, as it can be used for printers other than a photoelectric printer, for example, an ink jet printer, a thermal transfer type printer, or other multiple printers.

According to the present invention, in a multiple printer, patterns for registration correction can be detected accurately and easily, thereby preventing errors from occurring in reading patterns. Therefore, accurate registration is possible.

Many embodiments of the present invention can be made without departing from the spirit and scope thereof, therefore, it is to be understood that this invention is not limited to the specific embodiments thereof except as defined in the appended claims.

What is claimed is:

1. A multiple picture-image formation apparatus, comprising:
   a plurality of picture-image formation means each forming a picture image;
   pattern generation means for forming a pattern for registration correction by means of said plurality of respective picture images;
   a carrier in which said formed pattern is carried;
   reading means for reading said formed pattern;
   movement means for causing said carrier to move; and
   change means for changing the movement mode of said movement means between when a pattern is formed by said picture-image formation means and when the pattern is read by said reading means.

2. A multiple picture-image formation apparatus according to claim 1, wherein said change means sets said movement means to a continuous mode during said pattern formation and to an intermittent mode during said pattern reading.

3. A multiple picture-image formation apparatus according to claim 1, wherein said plurality of picture-image formation means form picture images of colors different from each other.

4. A multiple picture-image formation apparatus according to claim 1, wherein said plurality of picture-image formation means each form a picture image on an photoelectric recording body.

5. A multiple picture-image formation apparatus according to claim 1, wherein said change means changes said movement speed of said movement means between during said pattern formation and during said pattern reading.

6. A multiple picture-image formation apparatus according to claim 5, wherein said change means sets said movement speed during said pattern reading to a speed lower than that during said pattern formation.

7. A method of forming multiple picture images, comprising the steps of:
   forming a plurality of picture images and making them overlap each other;
   generating a pattern for registration correction for each of a plurality of picture images;
   forming said pattern on an image carrier;
   reading said formed pattern; and
   changing the movement mode of said image carrier between during pattern formation and during pattern reading.

8. A method of forming multiple picture images according to claim 7, wherein in said changing step, said image carrier is placed in a continuous movement mode during said pattern formation and placed in an intermittent movement mode during said pattern reading.

9. A method of forming multiple picture images according to claim 7, wherein in the picture-image formation step, picture images of colors different from each other are formed and made to overlap each other.

10. A method of forming multiple picture images according to claim 7, wherein in the picture-image formation step, picture images are formed by a photoelectric process.

11. A method of forming multiple picture images according to claim 7, wherein in said changing step, the movement speed of said image carrier is changed between during pattern formation and during pattern reading.

12. A method of forming multiple picture images according to claim 11, wherein in said changing step, the movement speed during said pattern reading is set to a speed lower than that during said pattern formation.

13. A picture-image formation apparatus that forms picture images by transferring a picture image formed on each photosensitive body by scanning, with a laser beam, onto a transfer belt which is moved by a transfer belt drive means for making a transfer belt move in a predetermined direction, comprising:
   transfer belt drive means for making a transfer belt move in a predetermined direction;
   pattern formation means that transfers a predetermined pattern for registration correction formed on each photosensitive body to said transfer belt that moves;
   reading means for reading said pattern which was transferred to said transfer belt by this pattern formation means; and
   switching means for switching a drive mode for said transfer belt drive means between during said pattern formation and during said pattern reading.

14. A picture-image formation apparatus according to claim 13, wherein said switching means switches a drive mode for said transfer belt drive means to a continuous drive mode at the time of pattern formation.

15. A picture-image formation apparatus according to claim 13, wherein said switching means switches a drive mode for said transfer belt drive means to an intermittent drive mode at the time of pattern reading.

16. A picture-image formation apparatus that forms picture images by transferring a picture image formed on each photosensitive body to a recording medium by scanning, with a laser beam, onto a transfer belt which is moved by a transfer belt drive means for making a transfer belt move in a predetermined direction, comprising:
   transfer belt drive means for making a transfer belt move in a predetermined direction;
   pattern formation means that transfers a predetermined pattern for registration correction formed on each photosensitive body to said transfer belt that moves;
   reading means for reading said pattern which was transferred to said transfer belt by this pattern formation means; and
   switching means for switching a drive speed set in said transfer belt drive means between during said pattern formation and during said pattern reading.

17. A picture-image formation apparatus according to claim 16, wherein said switching means switches a drive speed set in said transfer belt drive means at the time of pattern reading to a speed lower than a drive speed during pattern formation.

18. An image formation apparatus, comprising:
   a plurality of image formation means;
   pattern generation means for forming a registration pattern on at least one of said plurality of image formation means;
   a carrier movable in at least two different modes;
   transfer means for transferring the registration pattern to said carrier;
   reading means for reading said registration pattern; and
   change means for changing the movement mode of said carrier between when a registration pattern is formed on said image formation means and when the registration pattern is read by said reading means.

19. An image formation apparatus according to claim 18, wherein said change means sets said carrier to a continuous mode during said registration pattern formation and to an intermittent mode during said registration pattern reading.

20. An image formation apparatus according to claim 18, wherein said at least two modes include a first speed mode during said registration pattern formation and a second speed mode during said registration pattern reading.

21. An image formation apparatus according to claim 20, wherein said change means sets said first speed mode during said registration pattern reading to a speed lower than that during said registration pattern formation.

22. An image formation apparatus according to claim 18, wherein said plurality of image formation means form picture images of colors different from each other.

23. An image formation apparatus according to claim 18, wherein said plurality of image formation means each form a picture image on an photoelectric recording body.

24. A method of forming multiple picture images, comprising the steps of:
   forming a plurality of overlapping picture images on an image carrier;
   generating a registration pattern for each of a plurality of picture images;
   forming said registration patterns on the image carrier;
   reading said formed patterns; and
   changing the movement mode of said image carrier between during registration pattern formation and during registration pattern reading.

25. A method of forming multiple picture images according to claim 24, wherein in said changing step, said image carrier is placed in a continuous movement mode during said registration pattern formation and placed in an intermittent movement mode during said registration pattern reading.

26. A method of forming multiple picture images according to claim 24, wherein in said changing step, the movement speed of said image carrier is changed between during registration pattern formation and during registration pattern reading.

27. A method of forming multiple picture images according to claim 26, wherein in said changing step, the movement speed during said registration pattern reading is set to a speed lower than that during said registration pattern formation.

28. A method of forming multiple picture images according to claim 24, wherein in the picture-image formation step, picture images of colors different from each other are formed and made to overlap each other.

29. A method of forming multiple picture images according to claim 24, wherein in the picture-image formation step, picture images are formed by a photoelectric process.

30. An image formation apparatus that forms picture images by transferring picture images formed by laser beam scanning on each of plural photosensitive bodies onto a transfer belt, comprising:
   transfer belt drive means for moving the transfer belt in a predetermined direction;
   means for transferring a registration pattern onto the transfer belt from at least one of said plural photosensitive bodies;
   reading means for reading said transferred registration pattern; and
   switching means for switching a drive mode for said transfer belt drive means between during said registration pattern transfer and during said registration pattern reading.

31. An image formation apparatus according to claim 30, wherein said switching means switches a drive mode for said transfer belt drive means to a continuous drive mode at the time of registration pattern transfer.

32. An formation apparatus according to claim 30, wherein said switching means switches a drive mode for said transfer belt drive means to an intermittent drive mode at the time of registration pattern reading.

33. An image formation apparatus that forms picture images by transferring picture images formed by laser beam scanning on each of plural photosensitive bodies onto a recording medium, comprising:
   a recording medium carrier for moving the recording medium in a predetermined direction;
   means for transferring a registration pattern onto the carrier from at least one of said plural photosensitive bodies;
   reading means for reading said transferred registration pattern; and
   switching means for switching a drive speed of said carrier between during said registration pattern transfer and during said registration pattern reading.

34. An image formation apparatus according to claim 33, wherein said switching means switches a drive speed set in said carrier at the time of registration pattern reading to a speed lower than a drive speed during pattern transfer.

* * * * *

UNITED STATES PATENT AND TRADEMARK OFFICE
CERTIFICATE OF CORRECTION

PATENT NO. : 5,241,400
DATED : August 31, 1993
INVENTOR(S) : HIROSHI ITAGAKI

It is certified that error appears in the above-identified patent and that said Letters Patent is hereby corrected as shown below:

COLUMN 1
    Line 24, "and" should read --are--; and
    Line 59, "prints" should read --printers--.

COLUMN 2
    Line 13, "registration" should read --registration pattern--;
    Line 17, "of the pattern formation" should be deleted;
    Line 18, "means," should be deleted; and
    Line 32, "by," should read --by--.

COLUMN 4
    Line 48, "outputs" should read --output--.

COLUMN 6
    Line 8, "A pattern" should read --A registration pattern--; and
    Line 23, "an" should read --a--.

COLUMN 7
    Line 20, "pattern" should read --registration pattern--;
    Line 27, "pattern" should read --patterns--;
    Line 28, "drum 2 to 5" should read --drums 2 to 5--; and
    Line 54, "performs" should read --perform--.

COLUMN 8
    Line 20, "is" should read --are--; and
    Line 68, ""regis·"" should be deleted.

COLUMN 9
    Line 1, "tration" should be deleted, and "A pattern" should read --A registration pattern--.

UNITED STATES PATENT AND TRADEMARK OFFICE
CERTIFICATE OF CORRECTION

PATENT NO. : 5,241,400
DATED : August 31, 1993
INVENTOR(S) : HIROSHI ITAGAKI

It is certified that error appears in the above-identified patent and that said Letters Patent is hereby corrected as shown below:

COLUMN 10
        Line 6, "7 RAM 34" should read --$\gamma$ RAM 34--;
        Line 23, "A pattern" should read
--A registration pattern--;
        Line 42, "station" should read --stations--; and
        Line 22, "pictures image" should read
--picture images--.

Signed and Sealed this

Seventh Day of June, 1994

Attest:

BRUCE LEHMAN

*Attesting Officer*      *Commissioner of Patents and Trademarks*